UNITED STATES PATENT OFFICE.

FRANZ WILHÖFT, OF NEW YORK, N. Y.

VULCANIZED SOFT RUBBER AND PROCESS OF MAKING SAME.

SPECIFICATION forming part of Letters Patent No. 321,410, dated June 30, 1885.

Application filed April 9, 1885. (Specimens.)

*To all whom it may concern:*

Be it known that I, FRANZ WILHÖFT, of the city of New York, county and State of New York, have invented a new and Improved Vulcanized Soft Rubber and Process of Making the Same, of which the following specification is a full, clear, and exact description.

This invention has for its object to produce vulcanized soft rubber in which all the sulphur is chemically combined with the rubber.

It consists, essentially, in exposing the rubber with sulphur to a minimum heat of 330° Fahrenheit; also in the product derived from such process, all as will be hereinafter more fully described.

Before entering upon an explanation of my new process of manufacturing vulcanized soft rubber it may be well to outline first the method now generally in use by manufacturers and to give a description of the goods produced by it. This process consists in incorporating sulphur or some of its metallic combinations with cleaned or purified rubber upon hot rolls, shaping the articles out of this mass and subjecting the same for a longer or shorter time to steam-heat in a vulcanizer or to dry heat in presses. (Method of Charles Goodyear, patented February 24, 1839.) In practice manufacturers at the present time have only modified Goodyear's plan as far as the quantity of sulphur or sulphur combinations, the degree of heat, and the length of time that the goods are exposed to the heat are concerned. These modifications or variations of the old plan comprise the so-called "secrets" of our individual rubber manufacturers. The quantity of sulphur used at present ranges between six and twelve per cent., and in some cases even more, of the weight of pure rubber, and the heat varies between 280° and 300° Fahrenheit. The duration of vulcanization is made to depend upon the amount of sulphur or its metallic combinations contained in their compounds. The more sulphur the shorter the duration of the application of heat, and vice versa.

All vulcanized soft-rubber goods as at present manufactured have two great faults in common. First, they readily lose their elasticity and become sooner or later stiff, brittle, and worthless by after vulcanization, caused by the action of the free sulphur they contain; and, secondly, they are continually covered by an efflorescence of sulphur, (bloom), which depends, also, upon free uncombined sulphur. This blooming of vulcanized soft rubber is a very annoying feature, inasmuch as it destroys the appearance of soft-rubber goods, and makes the coloring of soft rubber, which is otherwise easily accomplished, useless. In order to get rid of the blooming of their goods manufacturers generally resort to boiling their vulcanized soft-rubber goods in a solution of soda or potash to dissolve the efflorescence of sulphur, although they are aware that while they, by this process, improve the looks of their goods, they at the same time materially impair their quality.

The efflorescence of sulphur (bloom) which covers all vulcanized soft rubber which has not been boiled in soda or potash, is clear proof of the facts, either that it contains more sulphur than can enter into a lasting combination with the rubber, or that the combination, if effected at all, does not last any longer than the process of vulcanization itself. On the other hand, there cannot be the least doubt that by vulcanization a portion of the sulphur really combines with the rubber, because the properties of both sulphur and rubber are changed by it. Rubber and sulphur are both soluble in carbon bisulphide; but after having been mixed and vulcanized the product cannot be dissolved by it. This proves conclusively that chemical action has taken place.

In order to produce vulcanized soft rubber in which the combination of india-rubber and sulphur is so perfect that the mass after vulcanization does not part with any of its sulphur, it requires a degree of heat much above that generally used for vulcanizing soft rubber. It is well known that sulphur, being an allotropic body, changes its form, and with it its chemical properties, under certain circumstances. Sulphur melts at about 235° Fahrenheit into a lemon-colored very liquid fluid. As the heat is increased this fluid becomes gradually darker and thicker until it finally gets nearly black, and so thick that it does not flow from the vessel containing it when it is upset, and when poured into cold water becomes tough and elastic. (Amorphous sulphur.) This occurs under a heat of 330° to 390° Fahrenheit. When the heat is raised to above 600° Fahrenheit, this thick mass is seen to become fluid again, but of a black color, until it finally boils and its heavy fumes condense on cold objects, as flowers of sulphur. Heat above 330° Fahrenheit brings about the condition of sulphur in which it will combine with india-rubber without having a tendency of separating from it.

In order to make vulcanized soft rubber, which after vulcanization does not contain any free sulphur, it is necessary to use no more sulphur than is required to vulcanize the rubber under the heat just mentioned. This minimum of sulphur varies very much, according to the quality of india-rubber to be used. For the best of Pará rubber three and one-eighth per cent. is the minimum; but for the lower grades the amount of sulphur may have to be increased to four or five per cent.

I have experimented with all degrees of heat between 330° and 362° Fahrenheit, and have found that the following plan of manufacturing vulcanized soft rubber gives the most perfect results. I incorporate by means of hot rollers into a batch of well-cleaned and perfectly-dry Pará rubber three and three-fourths per cent. of flowers of sulphur, which should be free of sulphurous acid, in such a thorough manner that upon examination of the thinnest film of the mass no sign of sulphur is visible. Now, the coloring and other matters are worked in so as to produce a perfectly homogeneous mass, and this is worked up into such articles as may be wanted. The goods are now placed within the vulcanizer, and live steam, from a boiler built for the purpose, is admitted in the usual manner until the heat reaches about 350° Fahrenheit, equal to about one hundred and eighteen pounds of steam-pressure to the square inch. After continuing this heat for about ten to thirteen minutes the vulcanization is finished and the goods may be removed. The result of this operation is vulcanized soft rubber which does not contain any free sulphur, and therefore cannot bloom nor become hard and brittle by after vulcanization.

By my improved process I am enabled to vulcanize the rubber in about one-third the time it has heretofore taken.

I claim as my invention—

1. As a new article of manufacture, vulcanized soft rubber in which all the sulphur is chemically combined with the rubber, substantially as specified.

2. The process of vulcanizing soft rubber which consists in exposing it with sulphur to a minimum heat of 330° Fahrenheit, substantially as specified.

3. The process of vulcanizing soft rubber which consists in mixing it with three and three-eighths or less per cent. of sulphur and subjecting it to a heat of 330° Fahrenheit, or over, substantially as specified.

F. WILHÖFT.

Witnesses:
F. V. BREISEN.
ROBT ROY.